dized microcrystalline waxes, polyolefins such as polyethylene and oxidized polyolefins such as oxidized polyethylene, carnauba, beeswax, hydrogenated castor oil, ouricury, petrolatum, mixtures thereof, and the like.

United States Patent Office 2,949,374
Patented Aug. 16, 1960

2,949,374

POLISHING COMPOSITION

Edward R. Kendall, Chicago, Ill., assignor to Simoniz Company, a corporation of Delaware No Drawing. Filed Dec. 29, 1958, Ser. No. 783,080

15 Claims. (Cl. 106—10)

This invention relates to a combined cleaning and polishing composition that is adapted to be applied to a surface such as the finish on household enamelware, automobile bodies, and similar surfaces.

This application is a continuation-in-part of my copending application Serial No. 602,524, filed August 7, 1956, now abandoned.

In polishing a surface such as that of an automobile body, it has been customary practice, to secure the most satisfactory results, to first use a cleaner on the surface to remove dirt, oxidized finish, and other dull surface elements in order to prepare the surface for polishing. Then after the surface has been cleaned, it is necessary to apply the polish or wax, spread it uniformly, and rub it to a high luster.

In an attempt to overcome these problems, various so-called combined cleaners and polishes, usually of a liquid nature, have been placed on the market. These have certain weaknesses and disadvantages as many of them do not polish to a long lasting luster. Perhaps the most serious difficulty of these combined cleaners and polishes, particularly the liquids, that have been put on the market is that the luster that is achieved has a very short life so that after a few weeks, or even after a few days, the automobile again looks dull and lusterless.

The compositions of this invention successfully solve the cleaning and polishing problems in that the compositions are each a combined cleaner and polish that not only does an efficient cleaning job, but also provides a luster that will last for long periods. The composition is easy to apply as it is in the form of a soft paste containing a thickener so that when the paste is worked in the container the composition becomes more fluid and is easier to "pick up" on a cloth or the like. The thickener also increases the mechanical and thermal stability of the composition. This also permits spreading the composition easily and quickly over a surface, such as an automobile.

One of the features of this invention therefore is to provide a combined cleaning and polishing composition consisting essentially of about 10-30% of finely divided abrasive, about 5-16% of a wax, about 2-12% of a polydialkylsiloxane, about 40-70% of a hydrocarbon solvent, and about 1-10% of a thickener dispersible in said solvent, all said amounts being by weight of said composition.

Other features and advantages of the invention will be apparent from the following description of certain embodiments thereof.

The preferred composition includes from about 10-30% of finely divided abrasive, about 5-16% of the wax, about 2-12% of a dialkylsiloxane, about 40-70% of a hydrocarbon solvent, and about 1-10% of a thickener. All percentages given herein are by weight.

Among the waxes that may be used satisfactorily in this invention are paraffins, microcrystalline waxes, oxidized microcrystalline waxes, polyolefins such as polyethylene and oxidized polyolefins such as oxidized polyethylene, carnauba, beeswax, hydrogenated castor oil, ouricury, petrolatum, mixtures thereof, and the like.

Waxes that have been found very effective in the composition of this invention are carnauba or polyethylene such as A.C. Polyethylene #6 made by Semet Solvay Division of Allied Chemical Corporation. A microcrystalline wax and preferably an oxidized microcrystalline wax is also effective. An excellent wax of this type is Patronauba C, an oxidized microcrystalline wax made by Bareco Wax Company, a division of Petrolite Corporation of 205 East 42nd Street, New York. Petrolatum may also be used and acts as a plasticizer for the composition. When petrolatum is present the gloss of the composition is noticeably improved.

The polyorganosiloxanes which may be used in this invention are those having a viscosity of about 50-60,000 centistokes measured at 100° F. Those having a higher viscosity are preferred. Thus, a polyorganosiloxane having a viscosity of about 30,000 centistokes has been found to give excellent results. Suitable polyorganosiloxanes are polyalkylsiloxanes, especially dialkylsiloxanes. The preferred one is polydimethylsiloxane. Examples of these are Dow-Corning DC-200 fluid and General Electric Company "Viscasil," which is a polydimethylsiloxane with the end of the molecule containing a monofunctional polysiloxane group.

Preferably about 40-70% of the entire composition is solvent. The amount of solvent may be varied within these ranges to provide the desired consistency of the composition and the desired drying rate, all as understood by those skilled in the art. The solvent acts as a carrier and is preferably a hydrocarbon. Among the suitable solvents are mineral spirit solvents such as "Amsco 460 Solvent" made by American Mineral Spirits Company and "Oleum Spirits" made by the Standard Oil Company of Indiana. Solvents of a Kauri-Butanol number of between about 20-105 are preferred, while solvents with a low Kauri-Butanol number of between about 20-45 are most preferred, with the optimum solvent being one with a number of about 35. However, under no circumstances are solvents to be used which are deleterious to the finish of the surface or which are drying oils.

Preferably 10-30% of the entire composition is an abrasive. Examples of finely divided abrasives are diatomaceous earth, which is produced by Johns Manville Corporation under the trade name "Celite 358," and aluminum oxide as represented by "Hydrated Alumina C-730" produced by Aluminum Company of America.

The thickener used in the composition of this invention should preferably be present in about 1-10% by weight of the entire composition. These thickeners are oleophilic and are dispersible in the hydrocarbon solvent. These thickeners and their characteristic operation in the presence of a hydrocarbon solvent are well known in the art. Typical thickeners include hydrous aluminum silicate, Bentone 38 and 34 (a dimethyldioctadecyl salt of montmorillonite clay) made by National Lead Co., colloidal silica, heavy metal soaps such as lead oleate, zinc oleate and zinc stearate, amphoteric metal soaps such as aluminum oleate and aluminum stearate, alkali metal soaps such as sodium oleate and sodium stearate and amphoteric naphthenates such as aluminum naphthenate. The above-mentioned soaps are preferably soaps of straight chain fatty acids of 12-20 carbon atoms.

The preferred thickener is a hydrogenated castor oil wax which is produced by hydrogenating castor oil to an extent resulting in a hard waxy product. Such a hydrogenated castor oil wax is disclosed in Abrams Patent No. 2,157,378. This product is milk-white in color, has a specific gravity of about 0.99 at 20° C., has a melting or solidifying point in the range of about 171–178° F., an acid number of about 2, a saponification number of about 180, and an iodine number of about 3. A thickener such as this is produced by the Baker Castor Oil Co. of New York under the trade name "Thixcin."

In order to provide better cleaning action and better surface wetting action, a small amount of isoamyl acetate, commonly known as amyl acetate, may be included in the polishing composition of this invention. When used the amyl acetate is preferably present in an amount from about 0.1–2.0% of the composition with the preferred amount being about 1.0%.

Efficient coupling between the solvent and the pigment and the abrasive to produce a substantially homogeneous dispersion will be provided when a compound having a structural formula of

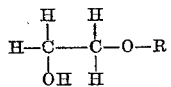

wherein R as a saturated aliphatic radical containing from 1–7 carbon atoms is used as a coupling agent. Such a compound is "Cellosolve" made by Union Carbide Company. This compound will generally be present in an amount of from about 1–4% of the composition with about 2% being preferred. The preferred compound is ethylene glycol monobutyl ether, which is sold by Union Carbide Company as "Butyl Cellosolve."

In order to achieve the best results with the composition of this invention it is important that the composition be intimately mixed during its production. This may be accomplished by subjecting the material to thorough mechanical agitation. The mixture may be agitated by the action of a propeller-type stirrer, by being pumped and repumped through a mixing-type pump or by being milled in a ball or pebble mill, in a roll mill, or in a colloid mill. A homogenizer is preferred as, in general, a device giving the highest degree of shear is preferred.

The following are examples of the method of making the polishing composition of this invention.

*Example 1.*—To a finishing kettle are added 29.84 pounds of Oleum Spirits, 28.74 pounds of Amsco 460 Solvent, and 1.96 pounds of Butyl Cellosolve. Then, with sufficient stirring to give rapid mixing 7.85 pounds of Celite 358 diatomaceous earth, 11.78 pounds of hydrated alumina, and .08 pound of iron oxide are added. In an auxiliary kettle 2.94 pounds of petrolatum are melted and added then to the finishing kettle along with 4.91 pounds of polydimethylsiloxane liquid having a viscosity at 100° F. of 30,000 centistokes, 7 pounds of carnauba, and 1.96 pounds of oxidized microcrystalline wax. The finishing kettle is now heated to 195° F. and held at that temperature until all the wax is melted. The batch is now cooled to 185° F. by circulating water at a temperature of 95–100° F. through tubes in the jacket of the finishing kettle. At this temperature 1.96 pounds of Thixcin are added. Then the cooling process is continued to about 140° F. or less and .98 pound of amyl acetate is added. The batch is further cooled until the temperature reaches 110° F. and it is held at that temperature until homogenizing is completed.

In order to homogenize the composition, it is passed into a homogenizer. The pressure is raised to 4,000 p.s.i. and the composition is pumped through a small orifice. This pumping is continued from 10–15 seconds at which time the composition is allowed to flow from the homogenizer to an auxiliary kettle. From the auxiliary kettle the polishing composition is filled into cans and allowed to cool to room temperature.

| | Examples | | | | | |
|---|---|---|---|---|---|---|
| | 2 | 3 | 4 | 5 | 6 | 7 |
| Amyl Acetate | .98 | 1 | .99 | 1 | .98 | .81 |
| Butyl Cellosolve | 1.96 | 2 | 1.98 | 2 | 1.96 | 1.61 |
| Diatomaceous Earth | 11.77 | 8 | 7.93 | 8 | 7.85 | 6.45 |
| Hydrated Alumina | 7.85 | 12 | 11.88 | 12 | 11.78 | 9.68 |
| Iron Oxide | 0.1 | | 0.14 | | 0.08 | 0.06 |
| Carnauba | 8 | 8 | 5.94 | 6 | 7 | 2.88 |
| Petronauba C | 1.96 | 2 | 1.98 | 2 | 1.96 | 1.61 |
| Petrolatum | 2.94 | 2 | 2.97 | 3 | 2.96 | 2.42 |
| Oleum Spirits | 29.34 | 31 | 30.69 | 31 | 29.84 | 24.93 |
| Polydimethylsiloxane (30,000 Centistokes) | 4.91 | 4 | 3.96 | 4 | 4.91 | 4.04 |
| A.C. Polyethylene #6 | | | | | | 2.06 |
| Thickener | 1.96 | 1 | 1.98 | 1 | 1.96 | 1.61 |
| Amsco 460 Solvent | 28.22 | 29 | 29.56 | 30 | 28.74 | 24.02 |

In Example 2 the thickener was the Bentone 34. In Example 3 it was lead oleate. In Example 4 it was aluminum oleate, in Example 5 is was sodium stearate, in Example 6 it was aluminum naphthenate and in Example 7 it was Thixcin.

The same procedures are followed in the above examples as given in Example 1. However, in Example 7 the pressure required to homogenize is only about 1,000 p.s.i. The amounts in these Examples 2–7 are in pounds.

The final consistency of the product can be controlled as desired by varying the temperature at which the product is homogenized. In general, the lower the temperature, the thinner the product. The preferred temperature into the homogenizer is 100–150° F.

Having described my invention as related to certain embodiments thereof, it is my intention that the invention be not limited by any of the details of description unless otherwise specified, but rather be construed broadly within its spirit and scope as set out in the accompanying claims.

I claim:

1. A polishing composition consisting essentially of: about 10–30% of finely divided abrasive; about 5–16% of a wax; about 2–12% of a polydialkylsiloxane; about 40–70% of a hydrocarbon solvent; and about 1–10% of an oleophilic thickener dispersible in said solvent, all said amounts being by weight of said composition.

2. A polishing composition consisting essentially of: about 10–30% of finely divided abrasive; about 5–16% of a wax; about 2–12% of a polydialkylsiloxane; about 40–70% of a hydrocarbon solvent; about 1–10% of an oleophilic thickener dispersible in said solvent; and about 1–4% of a compound of the structure $HOCH_2CH_2OR$ in which R is a saturated aliphatic radical containing from 1–7 carbon atoms, all said amounts being by weight of said composition.

3. A polishing composition consisting essentially of: about 10–30% of finely divided abrasive; about 5–16% of a wax; about 2–12% of a polydimethylsiloxane; about 40–70% of a hydrocarbon solvent; and about 1–10% of an oleophilic thickener dispersible in said solvent, all said amounts being by weight of said composition.

4. A polishing composition consisting essentially of: about 10–30% of finely divided abrasive; about 5–16% of a wax; about 2–12% of a polydimethylsiloxane; about 40–70% of a hydrocarbon solvent; about 1–10% of an oleophilic thickener dispersible in said solvent; and about 1–4% of a compound of the structure $HOCH_2CH_2OR$ in which R is a saturated aliphatic radical containing from 1–7 carbon atoms, all said amounts being by weight of said composition.

5. A polishing composition consisting essentially of: about 10–30% of finely divided abrasive; about 5–16% of a wax; about 2–12% of a polydimethylsiloxane; about 40–70% of a hydrocarbon solvent; and about 1–10% of an oleophilic thickener dispersible in said solvent; and about 1–4% of ethylene glycol monobutyl ether, all said amounts being by weight of said composition.

6. A polishing composition consisting essentially of:

about 10–30% of finely divided abrasive; about 5–16% of a wax; about 2–12% of a polydialkylsiloxane; about 40–70% of a hydrocarbon solvent; and about 1–10% of a hydrogenated castor oil wax, all said amounts being by weight of said composition.

7. A polishing composition consisting essentially of: about 10–30% of finely divided abrasive; about 5–16% of a wax; about 2–12% of a polydialkylsiloxane; about 40–70% of a hydrocrabon solvent; about 1–10% of a hydrogenated castor oil wax; and about 1–4% of a compound of the structure $HOCH_2CH_2OR$ in which R is a saturated aliphatic radical containing from 1–7 carbon atoms, all said amounts being by weight of said composition.

8. A polishing composition consisting essentially of: about 10–30% of finely divided abrasive; about 5–16% of a wax; about 2–12% of a polydimethylsiloxane; about 40–70% of a hydrocarbon solvent; and about 1–10% of a hydrogenated castor oil wax, all said amounts being by weight of said composition.

9. A polishing composition consisting essentially of: about 10–30% of finely divided abrasive; about 5–16% of a wax; about 2–12% of a polydimethylsiloxane; about 40–70% of a hydrocarbon solvent; about 1–10% of a hydrogenated castor oil wax; and about 1–4% of a compound of the structure $HOCH_2CH_2OR$ in which R is a saturated aliphatic radical containing from 1–7 carbon atoms, all said amounts being by weight of said composition.

10. A polishing composition consisting essentially of: about 10–30% of finely divided abrasive; about 5–16% of a wax; about 2–12% of a polydimethylsiloxane; about 40–70% of a hydrocarbon solvent; about 1–10% of a hydrogenated castor oil wax; and about 1–4% of ethylene glycol monobutyl ether, all said amounts being by weight of said composition.

11. A polishing composition consisting essentially of: about 10–30% of finely divided abrasive; about 5–16% of a wax; about 2–12% of a polydialkylsiloxane; about 40–70% of a hydrocarbon solvent; and about 1–10% of a member of the class consisting of hydrous aluminum silicate, dimethyldioctadecyl salt of montmorillonite clay, colloidal silica, heavy metal soaps, amphoteric metal soaps, alkali metal soaps, amphoteric naphthenates and hydrogenated castor oil wax, said member being dispersible in said solvent, all said amounts being by weight of said composition.

12. A polishing composition consisting essentially of: about 10–30% of finely divided abrasive; about 5–16% of a wax; about 2–12% of a polydialkylsiloxane; about 40–70% of a hydrocarbon solvent; about 1–10% of a member of the class consisting of hydrous aluminum silicate, dimethyldioctadecyl salt of montmorillonite clay, colloidal silica, heavy metal soaps, amphoteric metal soaps, alkali metal soaps, amphoteric naphthenates and hydrogenated castor oil wax, said member being dispersible in said solvent; and about 1–4% of a compound of the structure $HOCH_2CH_2OR$ in which R is a saturated aliphatic radical containing from 1–7 carbon atoms, all said amounts being by weight of said composition.

13. A polishing composition consisting essentially of: about 10–30% of finely divided abrasive; about 5–16% of a wax; about 2–12% of a polydimethylsiloxane; about 40–70% of a hydrocarbon solvent; and about 1–10% of a member of the class consisting of hydrous aluminum silicate, dimethyldioctadecyl salt of montmorillonite clay, colloidal silica, heavy metal soaps, amphoteric metal soaps, alkali metal soaps, amphoteric naphthenates and hydrogenated castor oil wax, said member being dispersible in said solvent, all said amounts being by weight of said composition.

14. A polishing composition consisting essentially of: about 10–30% of finely divided abrasive; about 5–16% of a wax; about 2–12% of a polydimethylsiloxane; about 40–70% of a hydrocarbon solvent; about 1–10% of a member of the class consisting of hydrous aluminum silicate, dimethyldioctadecyl salt of montmorillonite clay, colloidal silica, heavy metal soaps, amphoteric metal soaps, alkali metal soaps, amphoteric naphthenates and hydrogenated castor oil wax, said member being dispersible in said solvent; and about 1–4% of a compound of the structure $HOCH_2CH_2OR$ in which R is a saturated aliphatic radical containing from 1–7 carbon atoms, all said amounts being by weight of said composition.

15. A polishing composition consisting essentially of: about 10–30% of finely divided abrasive; about 5–16% of a wax; about 2–12% of a polydimethylsiloxane; about 40–70% of a hydrocarbon solvent; about 1–10% of a member of the class consisting of hydrous aluminum silicate, dimethyldioctadecyl salt of montmorillonite clay, colloidal silica, heavy metal soaps, amphoteric metal soaps, alkali metal soaps, amphoteric naphthenates and hydrogenated castor oil wax, said member being dispersible in said solvent; and about 1–4% of ethylene glycol monobutyl ether, all said amounts being by weight of said composition.

References Cited in the file of this patent

UNITED STATES PATENTS

| | | |
|---|---|---|
| 2,224,685 | Fritz et al. | June 10, 1941 |
| 2,839,482 | Geen et al. | June 17, 1958 |